Aug. 28, 1923.

C. A. BELL 1,466,292

PIPE ANCHORING MEANS

Filed May 10, 1922

INVENTOR
Chester A. Bell

BY
Mitchell, Chadwick Kent

ATTORNEYS

Patented Aug. 28, 1923.

1,466,292

UNITED STATES PATENT OFFICE.

CHESTER A. BELL, OF PROVIDENCE, RHODE ISLAND, ASSIGNOR TO GENERAL FIRE EXTINGUISHER COMPANY, OF PROVIDENCE, RHODE ISLAND, A CORPORATION OF NEW YORK.

PIPE-ANCHORING MEANS.

Application filed May 10, 1922. Serial No. 559,943.

*To all whom it may concern:*

Be it known that I, CHESTER A. BELL, a citizen of the United States, residing at Providence, in the county of Providence and State of Rhode Island, have invented certain new and useful Improvements in Pipe-Anchoring Means, of which the following is a specification.

This invention relates to improvements in anchoring means for pipes. More particularly it relates to means for securing a particular part of a pipe stationarily.

It is an object of the invention to provide such means adapted for use, for example, in connection with long lines of steam piping. In such a case the elongation of the pipe when heated is so great from its length when cold that it is necessary to provide some means by which the increase can be taken up, such as a U-loop, or a slip joint, or a long right angled bend; and it is often desired to make sure that the whole movement due to the elongation shall occur at such bend or joint. To accomplish that it is customary to anchor some distant part of the pipe which it is desired shall remain stationary. It has been found difficult to do this satisfactorily, because of the smooth exterior of the pipe, the extremely great power of the expansive force of the metal, and the consequent loosening and slippage which may occur where the pipe is clamped for anchorage. It is an object of the invention to improve over devices heretofore used for that purpose in such manner as both to reduce the cost and to improve the certainty and durability of the anchoring device and to relieve the pipe and device from all harmful effect of the radial expansion of the pipe.

These objects, and the advantages which are characteristic of the invention are attained by providing composite truss ears of modified H shape, adapted to be made integral with the pipe by fitting its exterior and being welded thereto on opposite sides thereof. These ears have horizontal and vertical webs, the vertical webs constituting the upright members of the H, assuming the pipe to be horizontal, and the horizontal web constituting the cross bar of the H and extending laterally beyond the uprights. The upright members have their tops and bottoms shaped on lines which preferably are inclined tangential with the periphery of the pipe. The horizontal webs are extensions of the horizontal diameter of the pipe. Lengthwise they extend between the vertical webs, and beyond; and their tips are inclined upward at a suitable angle to receive the stress of tie rods which extend from them obliquely upward to an overhead immovable support such as a girder. From the central horizontal web a tie or strut may rise vertically to the girder or other fixed body overhead.

Thus support and anchorage is obtained which does not encircle the pipe like clamps and which therefore is not subject to stress due to expansion of pipe radially. It also furnishes a support which is secured without being tightly compressed upon the pipe as a clamp must be in order to get the necessary friction to prevent slippage of the pipe under the enormous pressures which result from elongation and shrinkage with changes of the temperature. The application of the invention to a length of pipe can be made at the shop, under favorable conditions and at less expense than in the field. The arrangement of the webs edgewise against the pipe, and the attaching by welding, insure that there will be no later loosening of the attachment, as may occur when a screw clamp is used. When the ties have been connected and made taut, the anchorage causes the longitudinal distortion that results from change of temperature to be definitely thrown upon whatever device, such as a U bend is provided for receiving such distortion.

In the accompanying drawings one embodiment of the invention is illustrated. It is intended that the patent shall cover by suitable expression in the appended claims whatever features of patentable novelty exist in the invention disclosed.

Referring to the drawings.

Figure 1:
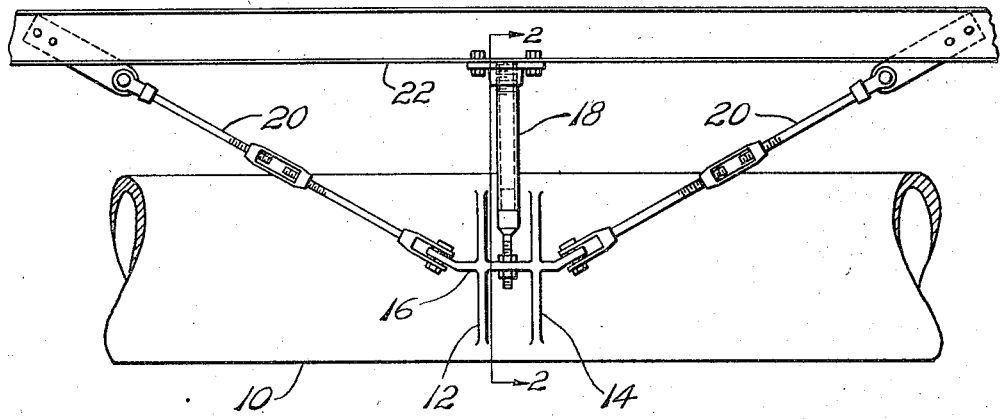
Figure 1 is a side elevation of an embodiment of the invention.
Figure 2:
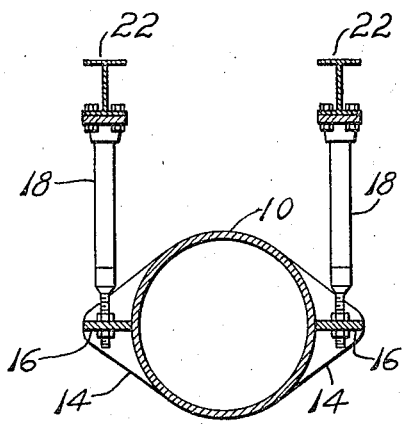
Figure 2 is an end elevation of same in section on line 2—2 of Figure 1.
Figure 3:
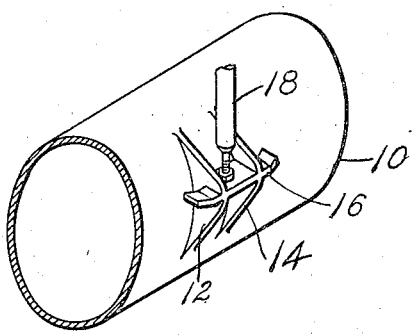
Figure 3 is a perspective view of the device.

In the drawings: the section of pipe 10 represents part of a pipe line subject to great variations in temperature, as, for example, a portion of a supply pipe for conducting high pressure or superheated steam. Provision (not shown) may be arranged at a distance whereby the "travel" of the pipe due to its elongation is permitted when the particular section of the pipe shown in the drawing is anchored. The means for anchoring comprise a pair of ears or brackets, which appear H-shape when viewed as in Fig. 1, adapted to be secured to opposite sides of the pipe, from each of which suitable rods may extend vertically and in both longitudinal directions to a fixed support. In the embodiment illustrated, the ears have three web plates, 12, 14 and 16, each of which has an edge shaped to conform to the curvature of the pipe, and rigidly affixed thereto as by welding, with the body of the plate outstanding from the curved surface of the pipe.

Webs 12 and 14 simulate the uprights of an H, being in parallel planes perpendicular to the axis of the pipe; and the other web, 16, like the cross bar of the H, is in a plane at right angles to the uprights and passing through the pipe's axis. The parallel webs serve as brackets or braces for the third or horizontal web 16, which latter extends between and beyond them. A vertical support 18 may be attached to its middle section, and tie rods 20 may be clamped to its projecting end sections, which are preferably bent upwards to align with the direction of pull in the tie rod. The supporting members may be hung from any suitable overhead means such as a girder 22. By this support each ear is held immovable; and being integrally secured to the pipe, the particular section of the latter to which they are attached is also restrained from any movement along the pipe's axis. The pipe may expand, however, without harm to the ears since being a part of the pipe and subject to substantially the same temperature changes they will expand an equal amount. When the pipe contracts upon cooling the ears follow. At no time is there any danger of the pipe and ears separating, consequently there can be no slippage or dislocation of the pipe with respect to its anchoring means. The outer edges of the parallel webs 12 and 14 are tangential to the pipe surface. This is of advantage in covering the pipe line with heat-insulating material, for a section of the material may be laid along both the top and bottom of the pipe, and only openings or spaces need be left for the ears to protrude. Such arrangement also occupies the minimum of room.

When the bracket is in use it is of course secured to and integral with the pipe, but consideration must be given to the stresses of the anchorage which tend to break loose the edgewise and therefore presumably frail fastenings of the various parts of the bracket. Considering this aspect the longitudinal web here assumed to be horizontal has a long bearing on the pipe in the direction of greatest stress, and the vertical members act as lateral braces to keep it upright. The longitudinal member moreover acts as a rib and brace in both longitudinal directions to keep the vertical members standing squarely on edge. Thus the whole stays rigidly connected notwithstanding that its members are connected only edgewise to the pipe. The vertical support 18 may be either a tie or a strut; or both. As a tie it can hold up the section of pipe; as a strut it can prevent any upward swing of this section of pipe about either tie 20 as a radius, thus perfecting the immobility of the brackets to which it is attached with a truss effect.

I claim:

1. A pipe anchoring device comprising an H-shaped truss ear adapted to be welded to a pipe; said ear having two web members corresponding to the up-rights of the H, and a third web member constituting the cross bar; combined with supporting means.

2. A truss plate adapted to be attached to a pipe comprising a pair of parallel webs extending radially from the pipe surface in planes at right angles to the pipe's axis, and a web connecting said parallel webs at right angles to each and extending radially from the pipe surface in the plane of the pipe's axis; the whole being adapted for attachment to a support.

3. A pipe anchoring bracket comprising a pair of parallel webs and a single web at right angles to said pair, all integral with each other and each adapted to fit against and be welded to a pipe; the said single web connecting and bracing the parallel webs and extending beyond them for attachment to a support; said extending ends being inclined to the axis of the pipe so that each extends in the direction of the tension of an anchorage tie extending to a point beside the pipe.

Signed at Providence, R. I., this 4th day of May, 1922.

CHESTER A. BELL.